Aug. 25, 1959

H. W. LEHMAN 2,900,846

ANTIBACKLASH DIFFERENTIAL MECHANISM

Filed Nov. 22, 1957

INVENTOR.
HARRY W. LEHMAN
BY
Moody & Hatcher
ATTORNEYS

United States Patent Office 2,900,846
Patented Aug. 25, 1959

2,900,846

ANTIBACKLASH DIFFERENTIAL MECHANISM

Harry W. Lehman, Marion, Iowa, assignor to Collins Radio Company, Cedar Rapids, Iowa, a corporation of Iowa Application November 22, 1957, Serial No. 698,243

2 Claims. (Cl. 74—714)

This invention relates in general to mechanical differential devices and more particularly to means for removing backlash in mechanical differentials.

In the art prior to this invention, no suitable means for removing backlash from differentials was available. As is well known, differentials relating the rotation of three shafts are used in instrument and computer work to quite an extent. In many light power applications whereby the position must be known to a high degree of accuracy, the mechanical differential is frequently the limiting factor in the accuracy and precision of the system.

Accordingly, it is an object of this invention to provide a method of loading differential gears so as to eliminate backlash.

It is a further object of this invention to provide a means for removing backlash from differential gear devices permitting very high precision in the differential action.

It is a feature of this invention that pairs of planetary gears meshing with the two sun gears in the differential are coupled by pairs of gear meshes having a different helix angle from that of the planetary and sun gear mesh, the coupling meshes being of opposite hand.

It is a further feature of this invention that a simple spring loading of a differential gear is achieved by the use of two pairs of planetary coupling gears utilizing a different helix angle from that used by the sun and planetary gears.

Figure 1:
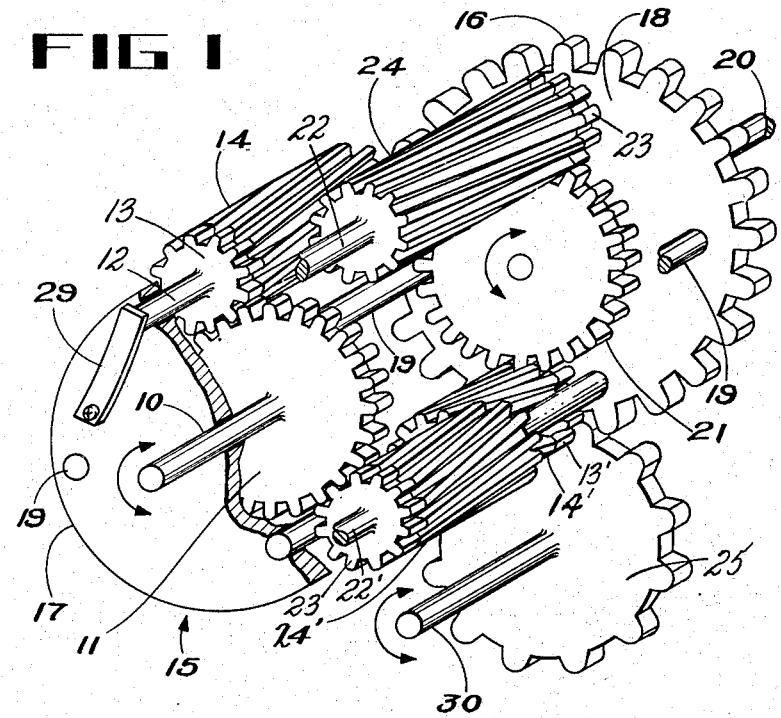
Figure 2:
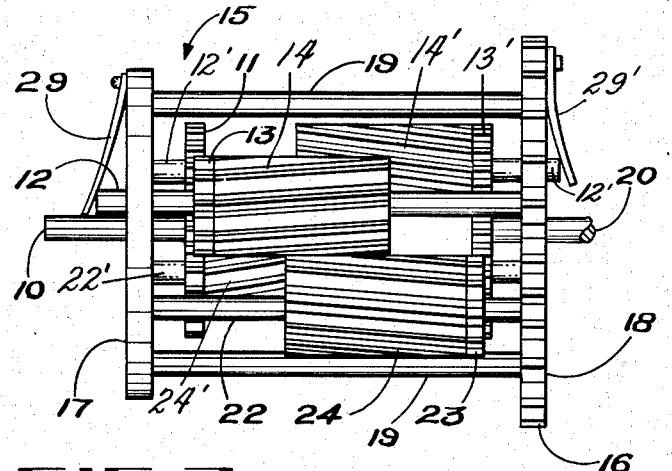

Further objects, features, and advantages of the invention will become apparent from the following description and claims when read in view of the drawings, in which:

Figure 1 shows a partially sectioned isometric view of an application of the invention, and Figure 2 shows a top view of Figure 1.

Differential gear assemblies are well known. These gear assemblies are also notorious for the number of gear meshes involved. These gear meshes each introduce a certain percent of backlash or zone of uncertainty of position. In instrument applications, such as well known mechanical computers, the differential served as a basic element. Many of the computations by the computer depended on the accuracy available and the precision of which the differential is capable. In the illustration of the invention described below, the differential is idealized as having three shafts which are intercoupled.

The differential comprises, as seen in Figure 1, a pair of shafts 10 and 20 which are coaxial. A third shaft 30 is shown to idealize the third or differential position relative to the rotation of the first two shafts 10 and 20. As is well known in differentials, the three shafts, 10, 20 and 30, are interrelated. A carrier 15 is rotatably mounted on the coaxial shafts 10 and 20. For some purposes, merely the position of carrier 15 serves as the third shaft idealized by shaft 30. Shaft 30 and carrier 15 are coupled by a carrier coupling 16 and gear 25, as illustrated, or by a roller chain, or some other method of positive coupling.

Carrier 15 is composed of a pair of end plates 17 and 18, end plate 18 having the coupling 16 cut on its edge. A pair of rods 19 are fixed to end plates 17 and 18 to maintain the spacing and parallelism of the end plates. Mounted on the ends of the shafts 10 and 20 within the carrier 15 are two sun gears 11 and 21 respectively. These sun gears are fixed to shafts 10 and 20 and rotate therewith.

Mounted on carrier 15, by unillustrated bearings in end plates 17 and 18, are two axles 12 and 22, as seen in Figure 2. Axle 22 is mounted so as to rotate freely but to have virtually no end play. Axle 12, on the other hand, has both free rotation and free end-wise motion.

Meshing with sun gear 11 is a planetary gear 13 having the same tooth characteristics as its sun gear. Gear 13 is fixed to planetary axle 12 in the form of the invention illustrated. Similarly matching with sun gear 21 is a planetary gear 23 also fixed to its planetary axle 22.

A helical gear mesh is used to couple the planetary gears 13 and 23. Fixed to gear 13 is a helical planetary coupling gear 14. Similarly, helical planetary coupling gear 24 is fixed to planetary gear 23. The two helical planetary coupling gears 14 and 24 are related to the planetary axle spacing such that a mesh is achieved, providing coupling between the two planetary gears 13 and 23.

As is best seen in Figure 1, this planetary gear coupling method requires pairs of links, each similarly constructed as indicated by the prime numbers. The prime numbered elements 14' and 24', however, are of opposite hand to the helical gear pair 14 and 24. Further, pairs of planetary couplings may be used if needed, each new pair providing additional load capacity for the differential system.

An important aspect of the invention resides in the characteristics of the planetary and planetary coupling gears. A characteristic of any gear is the helical angle; that is, the angle which a rod laid between the teeth makes with the axis of the gear. It is readily seen here that the helix angle of the sun and planetary gears is zero since these are shown as straight spur gears. The helix angle of the helical planetary coupling gears is very slight in the illustration, but may be any figure selected in comprehension of the invention. The important aspect, as will be understood from discussion of the operation given below, is that the helix angle of the planetary coupling gears be different from the helix angle of the planetary and sun gears.

A spring means 29 is provided to urge planetary axle 12 endwise relative to carrier 15 and, therefore, relative to the other planetary axle 22. The simplest spring, that shown, in the form of a flat spring, is mounted on the outside of the carrier on the end plate 17. Some applications may require the use of an additional spring operating on the other planetary axle 22 against its end play, but the single spring means shown is sufficient for light duty. It is to be noted that the planetary axle 12 is urged in one direction relative to the other axle carrying the planetary coupling gear means.

The second pair of planetary gears 13' and 23' and their corresponding coupling gears 14' and 24' mounted on axles 12' and 22' respectively are necessary for the elimination of a torque from spring 29 appearing in some output. Thus 14' and 24' are of opposite hand and create an opposing torque by means of spring 29'.

In operation, the differential couples shafts 10, 20 and 30 in a manner well known to those familiar with mechanical differential devices. The planetary gears and their coupling gear means 14 and 24 transfer motion between shafts 10 and 20, imparting also a reaction to the carrier 15. The presence of backlash or lost motion usually found when a shaft rotation is reversed would be present but for the spring means and the differences in helix angles. The endwise urging of the planetary axle 12 by the spring means 29 loads the gear train from shaft 10 to shaft 20. This occurs by the planetary to sun gear mesh 14 to 11 sliding due to the urging of the spring 29. The helical planetary gear mesh 14 to 24 also slides, but because of the difference in helix angle from that of the other gear mesh, soon makes solid gear tooth face to face contact. With planetary axle 22 fixed against end play, by tolerances in this form, or by another spring pushing in the other direction, the mesh of planetary gear 23 to sun gear 21 can only turn relatively.

With sufficient axial travel of the spring urged planetary axle 12, enough rotation caused by the difference in helix angles of the meshes arises to force a solid gear tooth face to face contact between all of the gears. This provides a direct, solid contact from shaft 10 to shaft 20.

Further axial motion of coupling gear 24, now, tends to cause shaft 20 to turn. This is prevented by the opposite-handed coupling gears 14' and 24', which operate similarly to 14 and 24, but for a torque of opposite hand applied to shaft 20. With the springs 29 and 29' balanced, the two torques are cancelled internally, leaving only a loaded gear train with no backlash below its load limits.

Assuming no backlash in the radial position of planetary axles 12 and 22, there is also no variation of position between either of the shafts 10 and 20 and the position of carrier 15. It is now possible to reverse rotation of either of the shafts, or the carrier, and have the same gear contact determine the rotational position of the other two shafts. This assumes that the loads are below the limits of the strength of spring 29.

With an understanding of the invention as outlined above, it is readily obvious that a plurality of pairs of planetary and planetary coupling gear sets may be used in exercise of the invention. It is further apparent that other spring means such as a coil spring mounted on the planetary axle between the carrier end plates and the planetary gears may be used in place of the flat antibacklash spring 29. It is further apparent that spring means acting on normal endplay of both planetary axles may be used in conjunction with the difference in helix angles to provide the benefits of the invention.

Although this invention has been described with respect to a particular embodiment thereof, it is not to be so limited because changes and modifications may be made therein which are within the full intended scope of the invention as defined by the appended claims.

I claim:

1. An antibacklash differential mechanism comprising a pair of rotatably mounted sun gears, a carrier rotatably mounted coaxially to said sun gears, paired planetary gear means meshing with said sun gears, said paired planetary gear means being rotatably mounted on said carrier, said paired planetary gear means being mutually coupled through coupling gear means having a helix angle different from the helix angle of said sun and planetary gear means, one planetary coupling being of opposite hand to that of the other coupling, spring means urging one part of each of said coupling gear means axially relative to the other part of said coupling gear means whereby said first shaft, said second shaft and said carrier are intercoupled with a minimum of backlash.

2. An antibacklash differential mechanism comprising a carrier means, first and second shafts, said first and second shafts being rotatable and coaxially mounted on said carrier means, a first sun gear mounted on said first shaft, a second sun gear mounted on said second shaft, first and third planetary gears rotatably mounted on said carrier means and meshing with said first sun gear, second and fourth planetary gears rotatably mounted on said carrier means and meshing with said second sun gear, first and third coupling gears mounted coaxially with said first and third planetary gears respectively, second and fourth coupling gears mounted coaxially with said second and fourth planetary gears respectively, said first and third coupling gears meshing, and said second and fourth coupling gears meshing, said sun and planetary gears having a helix angle different from that of said coupling gears, and spring means axially biasing said planetary and coupling gears whereby said first shaft and said second shaft and said carrier are intercoupled with a minimum of backlash.

References Cited in the file of this patent
UNITED STATES PATENTS

| | | |
|---|---|---|
| 1,968,604 | Hertz et al. | July 31, 1934 |
| 2,269,734 | Powell | Jan. 13, 1942 |
| 2,666,343 | Cassa Massa | Jan. 19, 1954 |